(12) United States Patent
Srinivasan et al.

(10) Patent No.: US 8,196,147 B1
(45) Date of Patent: Jun. 5, 2012

(54) MULTIPLE-PROCESSOR CORE OPTIMIZATION FOR PRODUCER-CONSUMER COMMUNICATION

(75) Inventors: Kiran Nenmeli Srinivasan, Cupertino, CA (US); Prashanth Radhakrishnan, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 887 days.

(21) Appl. No.: 12/262,314

(22) Filed: Oct. 31, 2008

(51) Int. Cl.
*G06F 3/00* (2006.01)
*G06F 12/00* (2006.01)

(52) U.S. Cl. ........................................ 719/310; 711/118
(58) Field of Classification Search .................. 719/310; 711/118
See application file for complete search history.

(56) References Cited

U.S. PATENT DOCUMENTS

| | | | | |
|---|---|---|---|---|
| 7,581,064 | B1 * | 8/2009 | Zedlewski et al. | 711/118 |
| 2003/0093623 | A1 * | 5/2003 | Crook et al. | 711/133 |
| 2007/0174411 | A1 * | 7/2007 | Brokenshire et al. | 709/213 |

OTHER PUBLICATIONS

Gregory, T.Byrd, Producer-Consumer Communication in Distributed Shared Memory Multiprocessors, 1999.*
Abdel-Shafi, Hazim, et al., "An Evaluation of Fine-Grain Producer-Initiated Communication in Cache-Coherent Multiprocessors", IEEE Proceedings of the Third International Symposium on High Performance Computer Architecture, Feb. 1997, San Antonio, TX, 8 pages.
U.S. Appl. No. 12/262,338, for Effective Scheduling of Producer-Consumer Processes in a Multi-Processor System, filed Oct. 31, 2008, by Prashanth Radhakrishnan, et al., 40 pages.

* cited by examiner

*Primary Examiner* — Lechi Truong
(74) *Attorney, Agent, or Firm* — Cesari and McKenna, LLP

(57) ABSTRACT

A novel technique for improving throughput in a multi-core system (and in a virtual machine environment) in which data is processed according to a producer-consumer relationship by eliminating latencies caused by compulsory cache misses. A producer process is executed on one processor core and two or more instances of a consumer process are executed on different cores so that while the first instance of a consumer process is executed in a "consuming" mode to process a first subset of data elements produced by the producer process, a second instance of the consumer process pre-fetches, to its cache memory, a second subset of data items produced by the producer process. As a result, the second subset of data items is already cached at the core where the second instance is running even before the consumer process starts processing the second subset of data items.

19 Claims, 8 Drawing Sheets

MULTIPLE-PROCESSOR CORE OPTIMIZATION FOR PRODUCER-CONSUMER COMMUNICATION

RELATED PATENT APPLICATION

This application is related to U.S. patent application Ser. No. 12/262,338, entitled "EFFECTIVE SCHEDULING OF PRODUCER-CONSUMER PROCESSES IN A MULTI-PROCESSOR SYSTEM," by Kiran Srinivasan and Prashanth Radhakrishnan, filed herewith.

FIELD OF THE INVENTION

The present invention relates to improving throughput of a computing device, and more particularly, to multiple processor core optimization for producer/consumer communication.

BACKGROUND

Producer-consumer relationship is at the heart of many computing systems. In a producer-consumer (P-C) model, there are different entities or processes (i.e. different producer-consumer pairs) that operate on the same data one after another, in a chain-like fashion, with each entity-process performing a different functionality. As a result, data is transferred between the different processes. In such a relationship, a producer thread calls a "producer method" to generate one or more data elements and place the data elements into a region of memory shared between a producer thread and a consumer thread. A consumer thread calls a "consumer method" to read the data elements and "consume" the data elements. A data element may represent a pointer to the area where the processed data items are stored in main memory. The consumer method accesses a pointer and performs multiple address translations in order to access data items in memory shared between the producer and consumer. The following example illustrates how producer-consumer relationship works to process data packets. In a networked storage server, an incoming data packet typically goes through the following processing layers: Ethernet driver→TCP/IP Layer→Network File System (NFS) protocol. In a producer-consumer model, there are at least three different threads of execution for the three functionalities (e.g., Ethernet driver processing, TCP/IP processing, and NFS processing). In order to receive the incoming request, the Ethernet driver acts as a consumer to a network interface card (NIC), which acts as the producer. Next, as a request traverses up the network stack, TCP/IP acts as a producer to the higher layer protocols (such as NFS or CIFS), which act as consumers, and so forth. Since the movement of data between the threads of execution is an integral functionality, efficiency of the producer-consumer communication is critical to the performance of a storage system or any other embedded system (i.e., a special purpose computer system designed to perform one or more dedicated functions). In contrast, in a non-producer-consumer model, the functionalities of different entities-processes are all carried out by a single process, which first picks up a data packet from the network using the Ethernet driver functionality, then does TCP/IP processing, and then does NFS processing. As a result, data are not transferred between different processes.

Multi-core systems are widely used to process data packets. Processor Core refers to a complete processing unit (registers, Arithmetic Logic Unit (ALU), Memory Mapping Unit (MMU), caches etc), several of which may be co-located on a single chip (die or socket). The number of cores on a socket is very product specific. For example, some of the products by Intel Corporation, of Santa Clara, Calif., have dual-core, quad-core processors etc.

A multi-core system combines two or more independent processor cores into a single package composed of a single integrated circuit (IC), called a die, or more dies packaged together. Typically, CPU cores are equipped with fast on-chip multi-level caches. For example, a CPU core may include two on-chip caches L1 and L2 for both data and instructions. L2 is generally much larger than L1, but has access times much slower than that of L1. In addition to these on-chip caches, the CPU cores might have a third-level larger L3 cache.

A multi-core processor implements multi-processing in a single physical package. In a multi-core environment, each of the producer and consumer processes may run on a different core, thereby providing several advantages. One of the advantages of running each of the producer and consumer threads on a different core enables parallelism between the consumer and producer threads so that more than one process can be executed at the same time. Furthermore, running producer and consumer processes on different cores may eliminate context switching overhead between the producer and consumer processes, which would be the case if they were to run on the same core. As is known in the art, a process is an instance of a computer program that is being sequentially executed. Context switching is performed when a process is loaded into a processor. Execution context information for each process may include data loaded into CPU registers, memory mapping information associated with the process (such as memory page tables), and/or other information related to a process.

As discussed above, when producer and consumer processes are running on different cores and communicating over a shared memory mechanism, the producer process writes to some locations in the shared memory region and the consumer process reads from those locations in the shared memory. Typically, a process is executed in a virtual address space created for that process. All processes use the memory mapping information available as part of its execution context to do the translation from virtual to physical addresses. Such a translation is done by the process on memory access using special hardware called a memory mapping unit (MMU) (not shown in Figures). However, to use the appropriate memory mapping translation tables for a process, the MMU needs to be loaded (programmed) with the appropriate address of the starting location of the memory mapping table. This address is usually part of the process' context maintained by the operating system.

In a shared memory based producer-consumer communication, the producer and consumer processes may not have mapped the shared memory at the same offset in their respective virtual address spaces. In this case, the virtual addresses need to be translated between the producer and consumer processes. The addresses pointed to by the producer process need to be in a form that is understood by the consumer process. Since the producer process is only executed in a virtual address space and can understand virtual addresses, these virtual addresses cannot be passed directly to the consumer process as the consumer process cannot translate the producer's virtual address to the physical address. According to one communication mechanism, the producer process passes relative addresses of the pointers to the consumer process. The passed pointers are relative to the start of the memory region shared between a consumer process and a producer process. The consumer process is entrusted to convert the relative addresses to the appropriate virtual addresses (based on where the shared memory region is mapped in its virtual address space) before accessing the data.

Before the consumer process can access data in memory, it needs to perform multiple translations of virtual to physical addresses. Such a translation entails multiple memory look-ups depending on the processor architecture and the size of the address. For example, for 64-bit architectures, multiple levels of page tables are accessed before the final translation can be done. The entries corresponding to each level of page tables need to be accessed and cached. After performing virtual-to-physical address translation, once the consumer thread accesses the data itself, there would be a compulsory miss in level 1 (L1) cache at the core on which the consumer thread is executed. At that time, the data item is fetched from further down in the memory hierarchy (e.g., main memory). These multiple address translations, which require extensive memory accesses as a result of compulsory cache misses, hurt the efficiency of the producer-consumer communication in a multi-core system. This, in turn, impacts overall system performance.

Accordingly, what is a needed is a mechanism that reduces existing inefficiencies of producer-consumer communication mechanism in multi-core systems.

SUMMARY

Embodiments of the present invention provide a novel technique for improving throughput in a multi-core system in which data are processed according to a producer-consumer relationship (i.e., different entities or processes operate on the same data one after another, in a chain-like fashion, with each process performing a different functionality). Multiple cores enable parallelism. One way to leverage the parallelism is to dedicate different cores for the producer and consumer processes. As used herein, the producer process produces data for the consumption by the consumer process. This data transfer has to have high throughput in order for the system to perform satisfactorily. In many practical cases, the processing speed of the producer process is much higher than that of the consumer process. In such scenarios, it is likely to envision a single producer process generating data for multiple consumer processes concurrently. According to embodiments described herein, a producer process is executed on one processor core to produce one or more data elements (address locations of processed data items in shared memory) and two or more instances of a consumer process are executed on different cores so that while the first instance of a consumer process is executed in a "consuming" mode (i.e., processing a first subset of data elements produced by the producer process), a second instance of the consumer process pre-fetches, to its local cache memory, a second subset of data elements produced by the producer process. Thus, advantageously, the second subset of data elements that need to be processed by the second instance of the consumer process is already cached at the core where the second instance is running, even before the second instance of the consumer process starts processing the second subset of data items. When execution of the consumer functionality on the first core has exhausted the first subset of the data items, the consumer execution moves to another core that has pre-fetched the second subset of data elements. Advantageously, no additional time is spent to perform lengthy address translations, which typically require multiple memory accesses. Importantly, pre-fetching the data elements occurred in overlapping manner to the consumption of the previous set of data elements. Since no additional time is spent on pre-fetching data elements, the number of data elements consumed by the system over a time interval (i.e., throughput) increases. Furthermore, since the cache memory is already populated with the second subset of data elements, the cache misses, which would have otherwise been incurred by the second instance of the consumer process, can be avoided.

As used herein, a producer process executes a set of instructions to receive data, to process data according to the producer functionality, and to provide address locations in a memory region shared by the producer process and the consumer process. The processed data items are stored in this shared memory. The consumer process, in turn, uses the address locations to access the processed data items and "consumes" data items by processing them according to the consumer functionality.

Furthermore, embodiments described herein are also applicable to virtual machine environment as described in greater detail below.

Other aspects of the invention will become apparent from the following detailed description taken in conjunction with the accompanying drawings, which illustrate the principles of the invention by way of example.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1A:
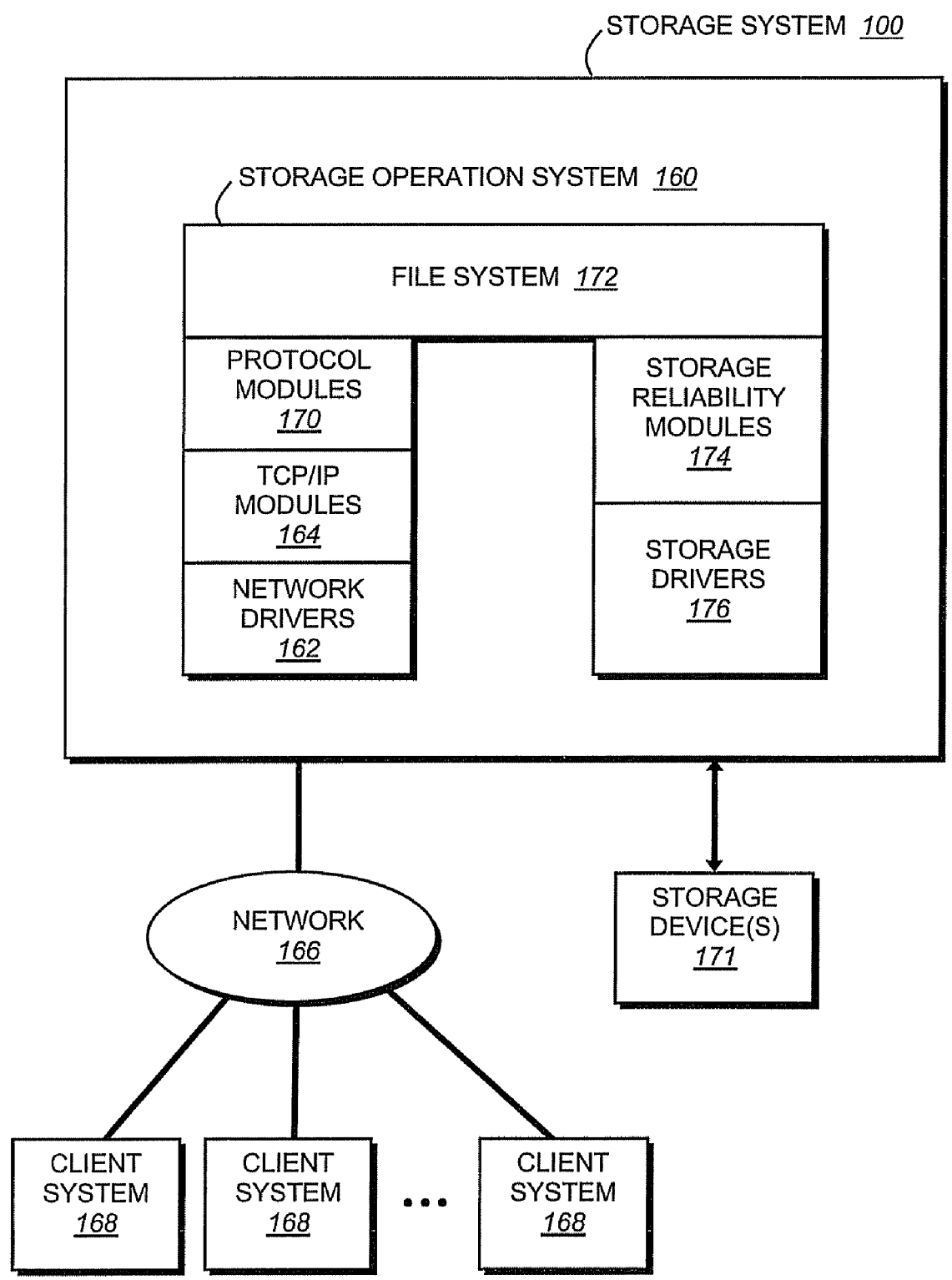
FIG. 1A is a diagram of components of an exemplary storage operating system.

FIG. 1A is a diagram of an exemplary storage system in which the present invention can be implemented. To illustrate a consumer-producer relationship, processing of a request sent to a storage system (such as storage system 100) can be considered. Such a storage system 100 services data access requests from the client systems 168. Each client system may be a general-purpose computer configured to execute applications and interact with the storage system 100 in accordance with a client-server model of data delivery. That is, the clients system 168 may request the services of the storage system 100, and the storage system may return the results of the services requested by the client by exchanging data packets over a network (e.g., network 166). A data packet is a unit of data transmitted as a discrete process between devices over a network.

The clients 168 may issue data packets using file-based access protocols and/or block-based access protocols. An exemplary storage system 100 executes a storage operating system 160, which includes components that participate in the producer-consumer relationship. For example, to receive an incoming request, a network driver(s) 162 of storage operating system 160 acts as the consumer for network interface cards (NIC) (not shown in FIG. 1A), which run producer threads. Network drivers 162 implement one or more lower-level protocols (such as Ethernet, or InfiniBand) to communicate over network 166.

Next, as a data packet moves up a network protocol stack (comprising lower level protocols and high level protocols), the lower layer protocol modules (such as TCP/IP module 164) act as producers to the higher layer protocol modules 170, which run consumer threads. Protocol modules 170 implement various higher level network protocols, such as Network File System (NFS), or Common Internet File System (CIFS), or Hypertext Transfer Protocol (HTTP). As a network protocol stack hands the data packet over to a file system 172, another producer-consumer relationship is created. File system 172 shown in FIG. 1B, in certain embodiments, is software, which imposes a structure (e.g., a hierarchy) on the data stored on storage devices 171 (such as disks).

Finally, in order to issue storage device request (such as a request to storage device(s) 171), the storage driver(s) 176 act as the producer, while the host bus adapter (HBA) (not shown in FIG. 1A) acts as the consumer.

Thus, in a series of producer-consumer relationships, different processes operate on the same data one after another in a chain-like fashion, with each entity performing a different functionality.

Still continuing with the description of a storage system in which the invention can be implemented, logically under file system 172, storage operating system 160 includes a storage access module 174 and storage drivers 176. Storage access module 174 implements a higher-level storage redundancy algorithm, such as RAID-3, RAID-4, RAID-5, RAID-6, or RAID-DP. The storage drivers 176 implement a lower-level protocol (such as Fibre Channel or SCSI) to access storage devices 171.

In the illustrative embodiment, the storage operating system 160 can be the NetApp® Data ONTAP™ operating system available from NetApp Inc., of Sunnyvale, Calif., that implements a Write Anywhere File Layout (WAFL™) file system, such as file system 172. However, it is expressly contemplated that any appropriate file system may be enhanced for use in accordance with the inventive principles described herein. As used herein, the term "storage operating system" generally refers to the computer-executable code operable on a computer that manages data access. The storage operating system 160 can be implemented as an application program operating over a general-purpose operating system, such as UNIX® or Windows NT®, or as a general-purpose operating system with configurable functionality, which is configured for storage applications as described herein. In addition, a specific embodiment of a storage operating system might be executing inside a virtual machine on top of a hypervisor. Hypervisor (a virtual machine monitor (VMM)) is a virtualization platform that allows multiple operating systems to run on a host computer at the same time).

Figure 1B:
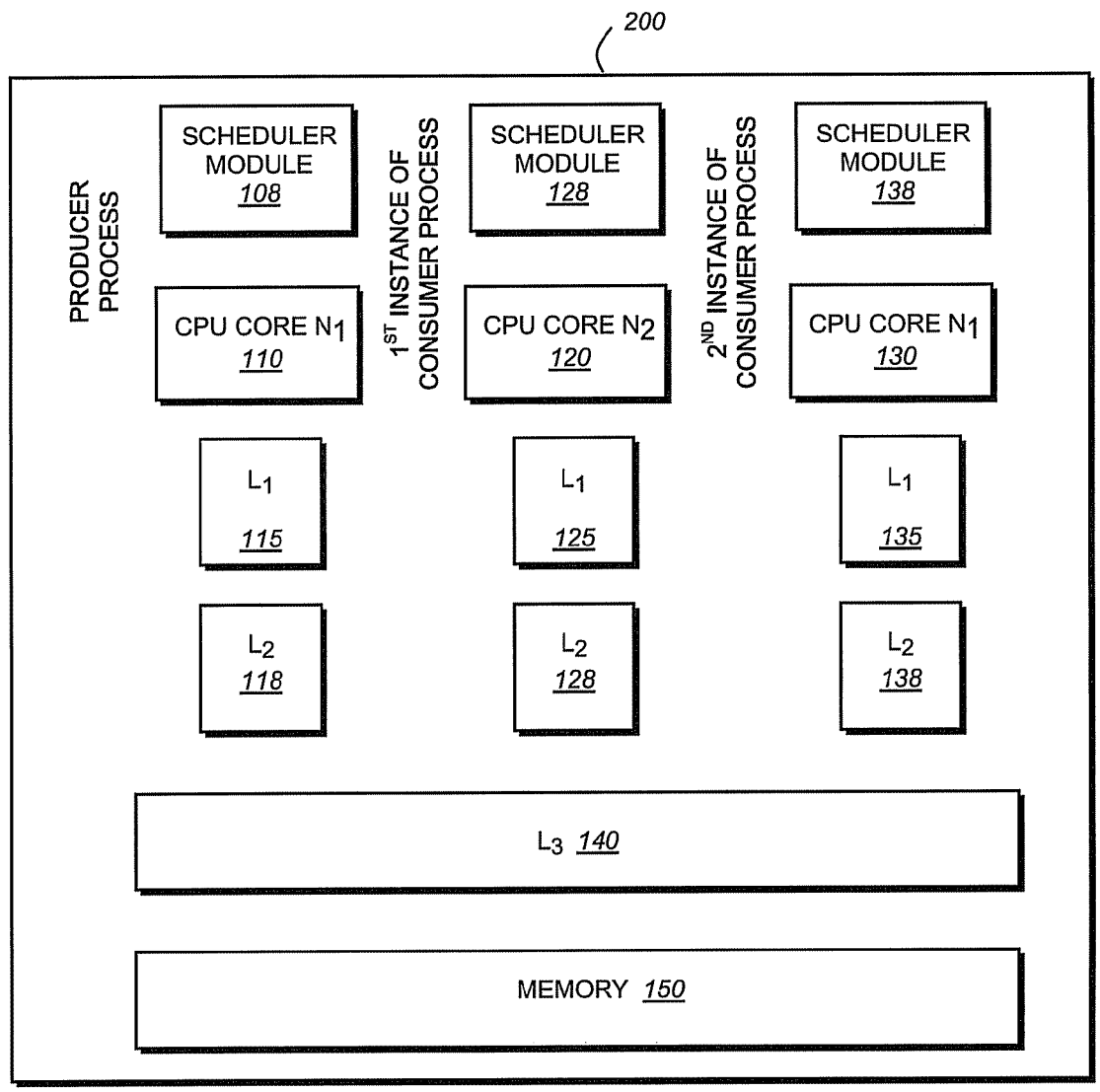
FIG. 1B is a diagram of a multi-core system according to embodiments of the present invention.

FIG. 1B is a schematic block diagram of a multi-core system 200 according to embodiments of the present invention in which one producer process and two or more instances of a consumer process are executed. Multi-core system 200 may be used as a storage system (such as storage system 100 shown in FIG. 1A). The multi-core system 200 combines two or more central processor unit (CPU) cores (e.g., cores N1 110, N2 120, and N3 130) into a single package composed of a single integrated circuit (IC), called a die, or more dies packaged together. Although only three CPU cores are shown in FIG. 1B, those skilled in the art would understand that a multi-core system may combine more than three CPU cores.

Multi-core system 100 also implements a multi-tier caching mechanism. Typically, CPU cores are equipped with fast on-chip multi-level caches to leverage spatial and temporal locality aspects of data accesses. Thus, a multi-core system may include two on-chip caches L1 and L2 for both data and instructions. L2 is generally much larger than L1, but with access times much slower than L1. In addition to these on-chip caches, the CPU cores might have a third-level larger L3 cache. Illustratively, in FIG. 1B, CPU cores in a multi-core system 200 may share a single cache memory at the highest on-device cache level (e.g. L3 140) and/or may have separate caches (e.g. L1 and L2). The CPU cores also share main memory 150. The caches are designed to ensure that a significant fraction of the memory accesses made by the CPU are satisfied in the cache with rare accesses to the main memory. The main memory represents any form of random access memory (RAM), flash memory, or the like, or a combination of such devices. While in use, the main memory 150 may contain, among other components, at least a portion of the storage operating system 160 of the storage system 100.

According to an embodiment of the invention shown in FIG. 1B, more than one instance of a consumer process can be running on different processor cores simultaneously so that while one instance of a consumer process "consumes" data elements produced by the producer process, another instance of the consumer process pre-fetches other data elements produced by the producer process (as will be described in more detail in reference to FIGS. 2 and 3). This, in turn, increases throughput of the multi-core system.

CPU core N1 may execute a producer process, while CPU cores N2 and N3 each execute different instances of a consumer process. Different processes may share the same set of instructions in memory. Each execution of the same set of instructions is referred to as an instance, which is a separate instantiation of a computer program. Thus, while CPU core N2 may execute a first instance of the consumer process, CPU core N3 may execute a second instance of the consumer process. As an illustrative example, CPU core N1 may execute the network driver module 162, which acts as the producer entity, to create a request in a form of a data packet. Processor cores N2 and N3, in turn, each may execute an instance of a consumer process (such as the TCP/IP module 164 or protocols module 170). Each CPU core (e.g., cores N1, N2, and N3) is associated with its scheduling module. For example, CPU core N1 is associated with scheduling module 108, which schedules a process (such as a producer process) to be executed by the CPU core N1. CPU core N2 is associated with a scheduling module 128, which schedules a process (such as a first instance of a consumer process) to be executed by the CPU core N2. CPU core N3, in turn, is associated with a scheduling module 138, which schedules a process (such as a second instance of a consumer process) to be executed by the CPU core N3. Once a process has been scheduled to a CPU core by a respective scheduling module (e.g., scheduling modules 108, 128, or 138), the execution context of the process is loaded into a CPU. Execution context information for each process may include data loaded into the registers, memory mapping information associated with the process (such as memory page tables), (an exemplary memory page table is shown in FIG. 3), and/or other information related to a process.

As part of the loading of a process by a scheduling module to a respective CPU core, the following steps may take place. First, operating system (such as storage operating system 160) creates a virtual address space for a process. Then, if the process is a producer process requiring a shared memory region with a consumer process, a shared memory region is created between a producer process and a consumer process utilizing the appropriate functionality provided by the operating system.

Figure 2:
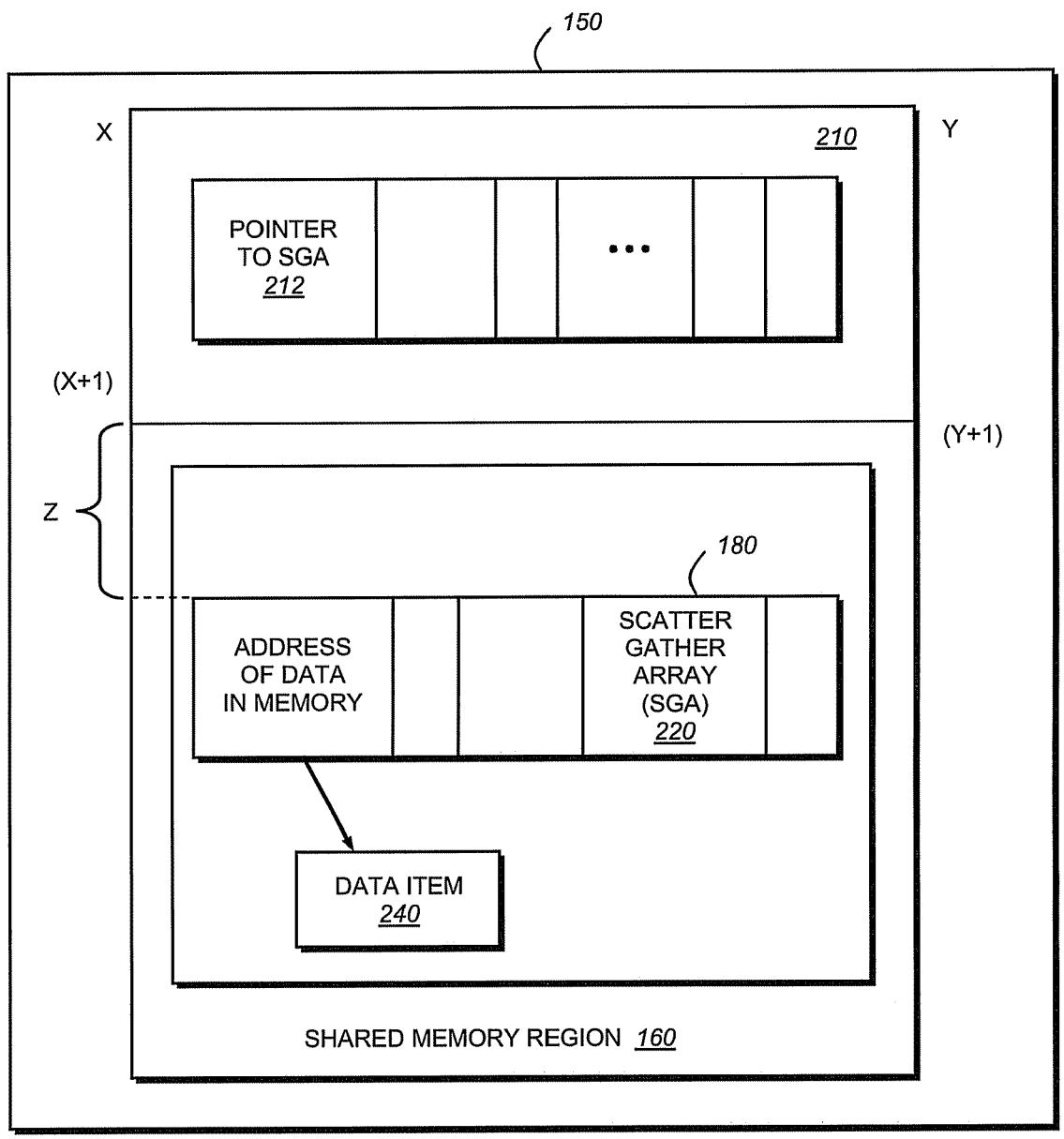
FIG. 2 is a diagram of the shared memory data structures used by a producer-consumer pair of the multi-core system shown in FIG. 1B.
Figure 3:
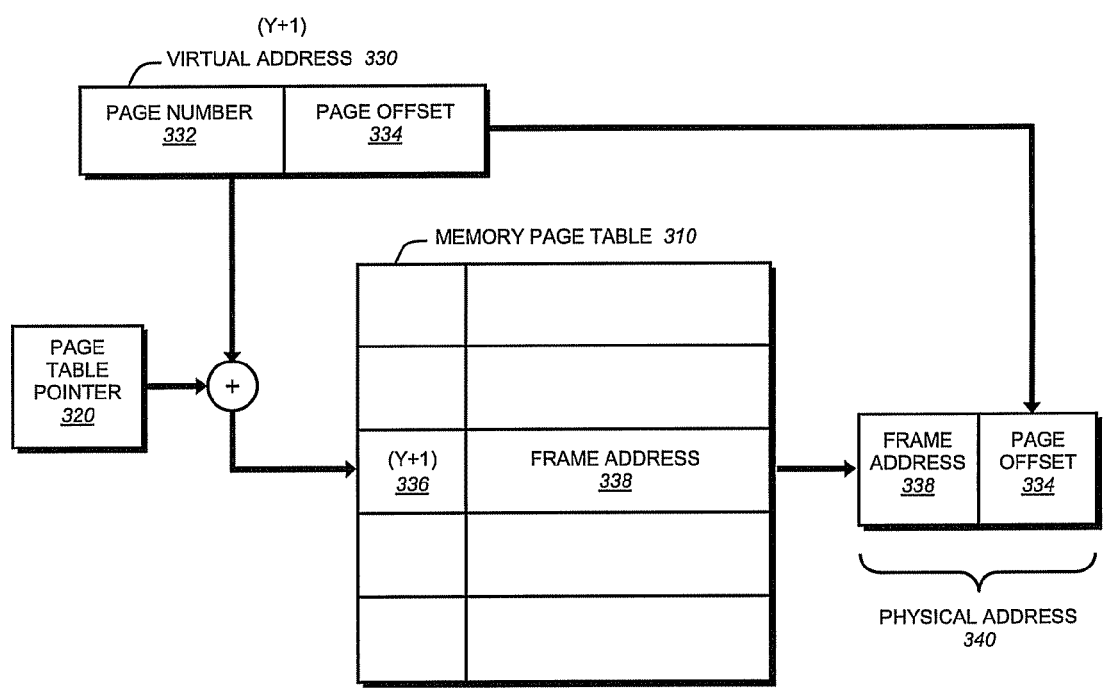
FIG. 3 is a diagram of a memory page table and mechanisms for converting a virtual address to a physical address.

Referring now to FIG. 2, a shared memory mechanism between the producer process and the consumer process is shown according embodiments of the present invention. In FIG. 2, memory 150 (which was shown in FIG. 1B) is shared among two or more CPU cores in the multi-core system 200 shown in FIG. 2. Within the memory 150, a memory region 230 is created, which is shared among the producer process and one or more consumer processes. For each process, the storage operating system creates a virtual address space (not shown in FIG. 2). As is known in the art, the virtual address space of the process may include data, computer instructions, the heap, and the stack. In FIG. 2, X is the virtual address of the producer process at which shared memory region 230 is mapped. Y is the virtual address of the consumer process at which shared memory region 230 is mapped.

At this point, it is useful to describe in more detail how in a conventional system a producer process and a consumer process communicate over a shared memory mechanism. Such a description is useful in distinguishing between conventional systems and a novel mechanism described herein to increase throughput of a producer-consumer pair in a multi-core system.

Still with reference to FIG. 2, for illustrative purposes, a producer process (such as executed by TCP/IP module 164) receives data packets from network drivers 162 (shown in FIG. 1A). The producer process stores the data packet in its associated cache memory (e.g., L1 cache 115 shown in FIG. 1B) and in the main memory 150. The producer process also provides a pointer to the stored data as follows. For every processed data packet, the producer process creates a scatter-gather array (SGA) 220 of elements that contains information of all the non-contiguous data segments that comprise the data packet. Each element in the aforementioned SGA typically contains a pointer to signify the starting address of the data in the main memory 150 along with the length of the data. The producer process then provides pointers for each SGA stored in the shared memory region 230. Such pointers (referred to herein as data entries) are stored in a shared data structure (such as data structure 212). Thus, each entry in the data structure 212 points to an address of the SGA in memory. Data structure 212 can be implemented as a first in, first out (FIFO) queue. Thus, if three data packets are received by the producer, producer process creates three SGAs. The shared data structure 212 then stores three entries. Each entry in the shared data structure points to an address where SGA starts in the shared memory region 230. For example, the address may include a page number in the shared memory region (e.g., page 1) and provide an offset within the page (e.g., offset Z shown in FIG. 2).

When a producer-consumer pair of processes needs to communicate with each other via a shared memory mechanism, the addresses pointed to by the producer process need to be in a form that is understood by the consumer process. However, the producer and consumer processes may not have mapped the shared memory at the same offset in their respective virtual address spaces. In this case, the virtual addresses need to be translated between the producer and consumer processes. According to one communication mechanism, a producer process passes relative addresses of the pointers to a consumer process. The passed pointers are relative to the start of the memory region shared between a consumer process and a producer process. The consumer process is entrusted to convert the relative addresses to the appropriate virtual addresses (based on where the shared memory region is mapped in its virtual address space) before accessing the data.

As described herein, typically, processes act only on virtual addresses and not on physical addresses. All processes use the memory mapping information available as part of its context to do the translation from virtual-to-physical addresses. Such a translation may be performed using special hardware called the memory mapping unit (MMU) (not shown in Figures). However, to use the appropriate memory mapping translation tables for a process, the MMU needs to be loaded (programmed) with the appropriate address of the starting location of the memory mapping table. This address is usually part of the process' context maintained by the operating system. Typically, before the consumer process can access a data packet from main memory (e.g., 150); it needs to perform multiple virtual to physical address translations, as illustrated below. Consumer accesses an entry(s) in the shared data structure 212 (which stores a relative address of SGA) and converts the relative addresses stored in the entry to a virtual address of SGA in the consumer's virtual address space. Then the consumer process accesses a memory page table associated with it to determine a physical address of an SGA in the main memory (an exemplary memory page table 310 is shown in FIG. 3). It should be noted that each virtual address space is associated with its own memory page table. Each memory page table has an address (shown as page table pointer 320 in FIG. 3), which is stored in main memory 150. Memory page table 310 includes a plurality of entries storing frame addresses. The entries are indexed by the page number (332) to determine the frame address. The page number (332) can be trivially derived from the virtual address (330) (As an example, the page number could be the 10 most significant bits of the virtual address). For example, if the page number (332) of the virtual address is (Y+1), it is used as an index to access a corresponding entry in the memory page table that stores a frame address (338). The physical address (340) of a data item is a combination of a frame address (338) and a page offset (334) (which was part of the virtual address 330).

Thus, when the consumer process accesses a data item, it first uses a virtual address of SGA to access a memory page entry indexed by the virtual address. As part of accessing the memory page table, the consumer process caches the corresponding entry in its cache memory (e.g., L1). Then the consumer process uses a frame address found in the page table entry to determine a physical address of SGA. To this end, the consumer process combines the frame address with the page offset found in the virtual address. The physical address, in turn, includes a frame address and the original page offset. The consumer process then caches the physical address in its associated cache memory. The translation mechanism described herein is explained for a one level page table. Those skilled in the art would understand that typically there are multiple levels of page tables before the final translation can be done. The entries corresponding to each level of page tables need to be accessed and cached. Multiple memory accesses for the page table entries performed without any help from the caches lead to high latency in accessing data stored in memory.

Once the consumer process has determined a physical address of the SGA, the consumer process can access SGA entries (each entry in the SGA stores an address of a data item in main memory 150). To this end, the consumer process reads a relative address stored in SGA entry and translates it to a virtual address. Furthermore, consumer process accesses a memory page table using the virtual address (as discussed above) and caches a corresponding entry in the table. Then, translation of the virtual-to-physical address is performed to determine the physical address of a data item. The physical address is then stored in a memory cache. The consumer uses the physical address to finally access the data item stored in memory. The consumer process then caches the data item in its cache memory.

Thus, in order to access data items produced by the producer process and stored in the main memory, a consumer process performs multiple memory accesses, which slow down overall system's performance.

According to embodiments of the present invention, the overhead associated with data accesses performed by the consumer process is significantly reduced by ensuring that the cache lines needed for virtual-to-physical address translation (i.e., memory page table entries), as well as the data items themselves, are pre-fetched to the cache memory associated with the core where the consumer process is running even before the consumer process starts consuming the data items.

To this end, a producer process is executed on one processor core to produce one or more data elements (address locations of processed data items in memory) and two or more instances of a consumer process are executed on different cores so that while the first instance of a consumer process is executed in a "consuming" mode (i.e., processing a first subset of data elements produced by the producer process), a second instance of the consumer process pre-fetches, to its local cache memory, a second subset of data elements produced by the producer process. Thus, advantageously, the second subset of data elements that need to be processed by the second instance of the consumer process is already cached at the core where the second instance is running even before the second instance of the consumer process starts processing the second subset of data items. When execution of the consumer functionality on the first core has exhausted the first subset of the data items, the consumer execution moves to another core that has pre-fetched data elements, but no additional time is spent to perform lengthy address translations, which typically require multiple memory accesses. Since no additional time is spent on pre-fetching data elements, the number of data elements consumed by the system over a time interval (i.e., throughput) increases. Based on the availability of additional cores, the described novel technique can be used so that more instances of the consumer processes can be started to do pre-fetching subsequent to the consumption of data.

This novel mechanism improves throughput of communication between two or more processes in a producer-consumer relationship, as illustrated in more detail with reference to FIG. 4.

Figure 4:
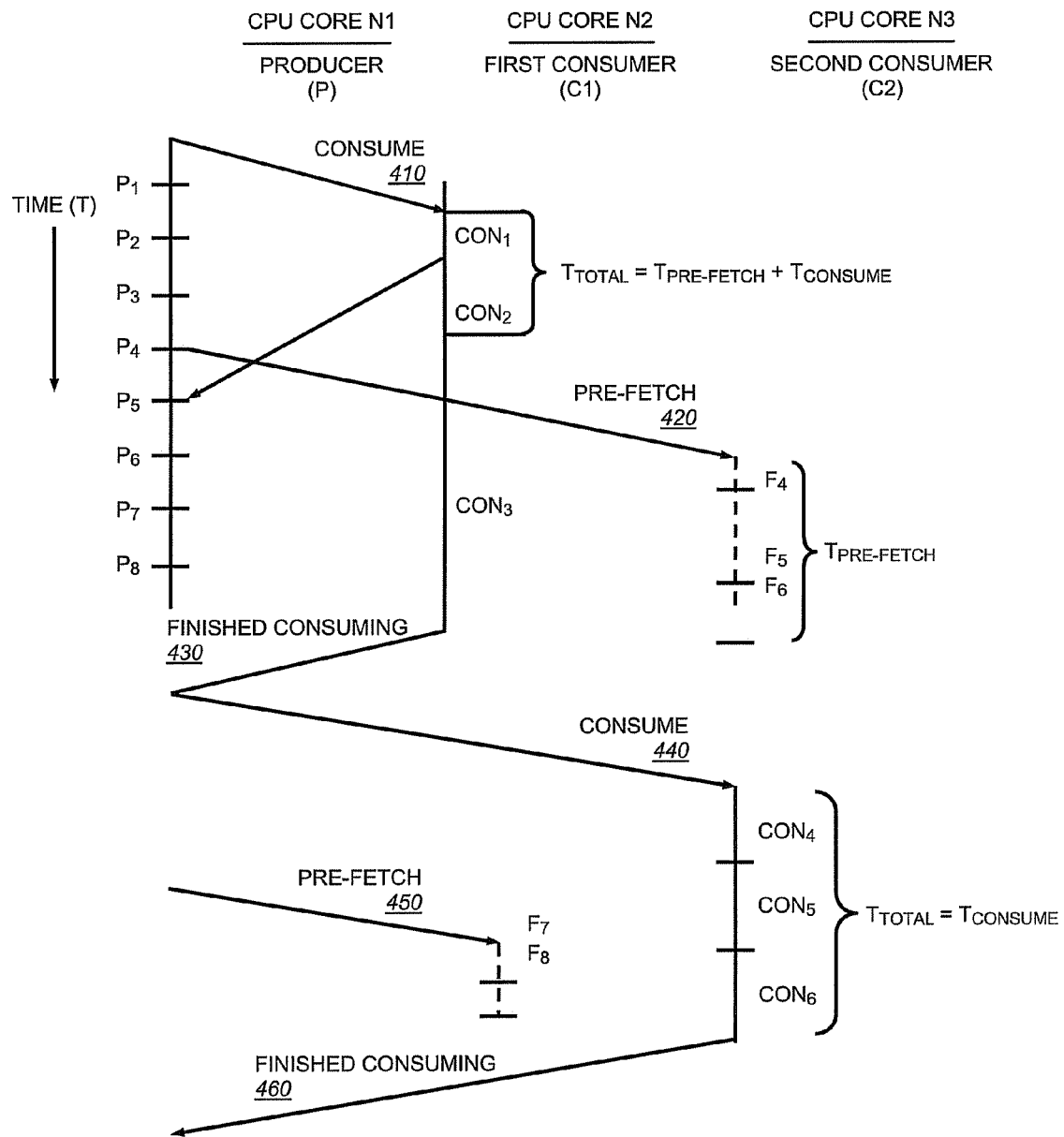
FIG. 4 is an event diagram of executing a producer thread and two or more instances of consumer threads according to a novel method to improve efficiencies in consumer-producer communications in a multi-core system.

Referring now to FIG. 4, an event diagram of a novel method for executing a producer process and two or more instances of consumer processes in a multi-core system 200 is shown. FIG. 4 illustrates three CPU cores N1, N2, and N3, represented by vertical lines. N1 core executes a producer process (P), N2 core executes a first instance of a consumer process (C1), and N3 executes a second instance of a consumer thread (C2). As described herein, C1 and C2 are two instances of the consumer software, i.e., they execute the same code, but in different processes and on different CPU cores.

For illustrative purposes, TCP/IP module 164 executes a producer process. More specifically, TCP/IP module 164 receives data packets from network drivers 162 (shown in FIG. 1A). The producer process (P) stores the data packets in its associated cache memory (e.g., L1 cache 115 shown in FIG. 1B) as well as in the main memory 150. As part of its functionality, the producer produces addresses (data elements), which point to the data items processed by the producer process and stored in the main memory. These data elements are shown as p1 through p8 in FIG. 4. The producer process then creates one or more scatter-gather-arrays (SGAs) for each data packet and stores relative addresses (p1 through p8) of each SGA in the shared data structure 212. Each entry in the SGA, in turn, stores a relative address of a data item in the main memory. Once the producer process puts data elements p1 through p8 in the shared data structure 212, it provides a notification to a scheduling module at the CPU core N2 to initiate the consumer process (line 410).

The producer process also determines how to split execution of the produced data elements between the first instance of the consumer process and the second instance of the consumer process. To this end, in one implementation, the producer process determines how quickly the first instance of the consumer process consumes a produced data element. In another embodiment, the producer process may communicate the estimated time to an external process (not shown in Figs.) that makes decisions about initiating a second instance of the consumer process. For example, the producer process estimates that it takes 1 second (or any other period of time) to consume one element produced by the producer process. Thus, if there are eight elements produced by the producer process, it may take up to 8 seconds to consume the produced elements.

As used herein, consuming of a data element by a consumer process involves pre-fetching into the main memory, the contents of the data item to which the data element points to and processing the data item. Pre-fetching of a data item includes accessing the SGA in the main memory, using a data element produced by the producer and stored in the shared data structure (e.g., 212). Using a relative address of the SGA, the consumer process determines a virtual address of the SGA in the consumer's address space. Then, using virtual address, the consumer process accesses an entry (indexed by the virtual address) of an associated memory page table and caches (in a cache memory associated with the CPU core executing the first consumer process) the frame address corresponding to the virtual address of the SGA. Then the consumer process uses the frame address to obtain the physical address of the SGA. The physical address is then used to access entries in the SGA. As described herein, accessing the data items pointed to by the entries in the SGA involves, in turn, translation of the relative address to a virtual address, accessing a memory page table, caching a corresponding entry and a frame address of a data item, identifying a physical address of a data item, caching the physical address in a memory cache, and finally using the physical address to access the data item in memory. In one implementation, data items are stored in the cache memory at the granularity of cache lines (e.g., 16 bytes, 64 bytes); therefore, memory accesses are accomplished at the granularity of cache line size.

Consumption of data elements, further involves processing data items referenced by the data elements using consumer functionality (in the example of the consumer process being a protocol module 170, the consumer process collects contiguous data items of a data packet, looks at a header of the data packet and reads data to determine which operation needs to be performed on the data packet. In FIG. 4, elements consumed by the first instance of the consumer process are shown as con1, con2, and con3, which represent elements in the shared queue (e.g., pointers to SGA).

Importantly, the total time (T total) to consume the elements by the first consumer instance C1 equals the time to pre-fetch (T pre-fetch) the data elements and the time to consume the data elements (Tc): T total=T pre-fetch+T consume.

According to novel mechanisms described herein, rather than waiting for the consumer process to consume all produced elements, the producer process initiates execution of a second instance of the consumer process on another CPU core (e.g., CPU core N3) to pre-fetch data items referenced by the data elements. To this end, in one implementation, the producer process P provides a notification in the form of a signal (line 420 in FIG. 4) to a scheduler module of the CPU core N3 (such scheduler module 138 is shown in detail in FIG. 1B) to initiate pre-fetching on data elements by the second instance of the consumer process. The signaling mechanism can be implemented by way of sending an interrupt signal from the CPU core executing the producer process to the CPU core executing a second instance of the consumer process. As is known in the art, "interrupt" is a hardware mechanism that enables a CPU being interrupted to execute something different from what is currently executing. As part of interrupt processing, it might wake up a thread or a process. Those skilled in the art would understand that other interrupt mechanisms can be used. The producer process may invoke the operating system routine requesting to raise an interrupt line on a CPU core N3 where the second instance of the consumer thread is executed.

In another implementation, a signaling mechanism can be implemented by way of setting a bit in a shared memory region indicating whether there are data elements to pre-fetch (for example, "1" may indicate that there are data elements; "0" may indicate that there are no data element), the number of elements to pre-fetch. In this implementation, the consumer process checks if the "bit" corresponding to the signaling has been set by the producer. In another implementation, rather than initiating the pre-fetch after a specific number of elements, the producer process may decide to initiate pre-fetching of data elements after a specified time interval. To this end, for example, the producer process may decide that after a pre-determined time interval (e.g., 2 seconds) the second instance of the consumer process should initiate pre-fetching of the data elements.

The CPU core N3 to which the context of the second instance of the consumer process is pre-loaded, receives a signal from the CPU core N1 that executes the producer process to initiate pre-fetching of the data elements. The second instance of the consumer process starts pre-fetching the data elements. For example, the signal indicates that the second consumer process needs to pre-fetch data elements p4, p5, and p6. Each data element p4, p5, and p6 represents a relative address of corresponding SGAs in the shared memory region. Thus, p4 is used to access SGA corresponding to one data packet, p5 is used to access SGA corresponding to another data packet, and p6 is used to access SGA corresponding to a third data packet. Consumer instance C2 performs translation of a relative address of each SGA to a virtual address and then to a physical address (using a memory page table associated with each virtual address). As described herein, pre-fetching further involves caching relevant entries in the memory page tables as well as caching physical addresses. Once the physical addresses of each SGA are determined, they are used to access entries in the SGA that store relative addresses of data items in memory. The relative addresses are again translated to physical addresses (as described herein). In FIGS. 4, f4, f5, and f6 are data elements which point to data items pre-fetched by the second consumer process executed on the CPU core N3. Thus, these data items are already cached to the cache memory associated with CPU core N3 even before a second consumer instance started its execution at the CPU core N3. It should be noted that C2 pre-fetches data items (to which elements f4, f5, and f6 point in memory) simultaneously with C1 consuming data elements con1, con2, and con3. As a result, when the second instance of the consumer process starts consuming the pre-fetched data items, no additional time is spent on pre-fetching the data items by CPU core N3 and the corresponding data is already in the cache.

Still continuing with the diagram shown in FIG. 4, once C1 finished consuming elements con1, con2, and con3, it sends a signal (line 430) to the producer process running on the CPU core N1. The signal indicates that the first instance of the consumer process completed consumption of data elements. Since the first instance of the consumer process running on CPU core N2 completed consumption of the data elements, another CPU core (N3) can start the second consumer process to consume data elements pre-fetched by the second consumer process.

The producer process (P) then sends a signal (line 440) to the second instance of the consumer process (C2) running on the CPU core N3 to initiate consumption of the data elements that it (i.e., C2) pre-fetched (e.g., these data elements point to data items stored in the cache memory associated with CPU core N3; these data items were pre-fetched as a result of multiple address translations using the pointers provided by data elements f4, f5, and f6). Since the pre-fetched data items are already stored in a memory cache (e.g., L1 cache) associated with the CPU core N3, the consumer process C2 accesses its cache memory to process the cached data items without incurring a compulsory cache miss described above. As described herein, consuming data items may involve processing the data items according to consumer functionality. While C2 consumes pre-fetched elements con4, con5, and con6, the total time (T total) equals time to consume the pre-fetched elements (T consume): T total=T consume. Notably, multiple memory accesses to perform address translations, which are typically required to pre-fetch data elements, have been avoided since the pre-fetch operation was executed in parallel with the consumption operation performed by the first consumer process (C1). Thus, pre-fetching data elements on one CPU core in parallel with consuming data elements on another CPU core in a multi-core system results in reduction of the total time to process data elements. This, in turn, improves overall system's throughput.

Still referring to FIG. 4, while second consumer process, C2, consumes data elements con4, con5, and con6, the producer process signals (line 450) the first consumer process C1 to initiate pre-fetching of data elements f7 and f8.

In the description of the above-illustrated embodiment, the producer process (P) shares memory 150 with all consumer processes executed in the multi-core system. However, in other implementations, a producer process does not share the same memory region with all consumer processes. For example, the producer process shares a first memory region with the first consumer process C1 and shares a second memory region with the second consumer process C2 so that C1 and C2 do not share the same memory region. In such an embodiment, each shared memory region has its own shared data structure where the producer process stores pointers (data elements) to data items. As a result, in this embodiment, a signal sent by the producer process to a second consumer process C2 does not need to provide a number of pre-fetched data elements.

Figure 5:
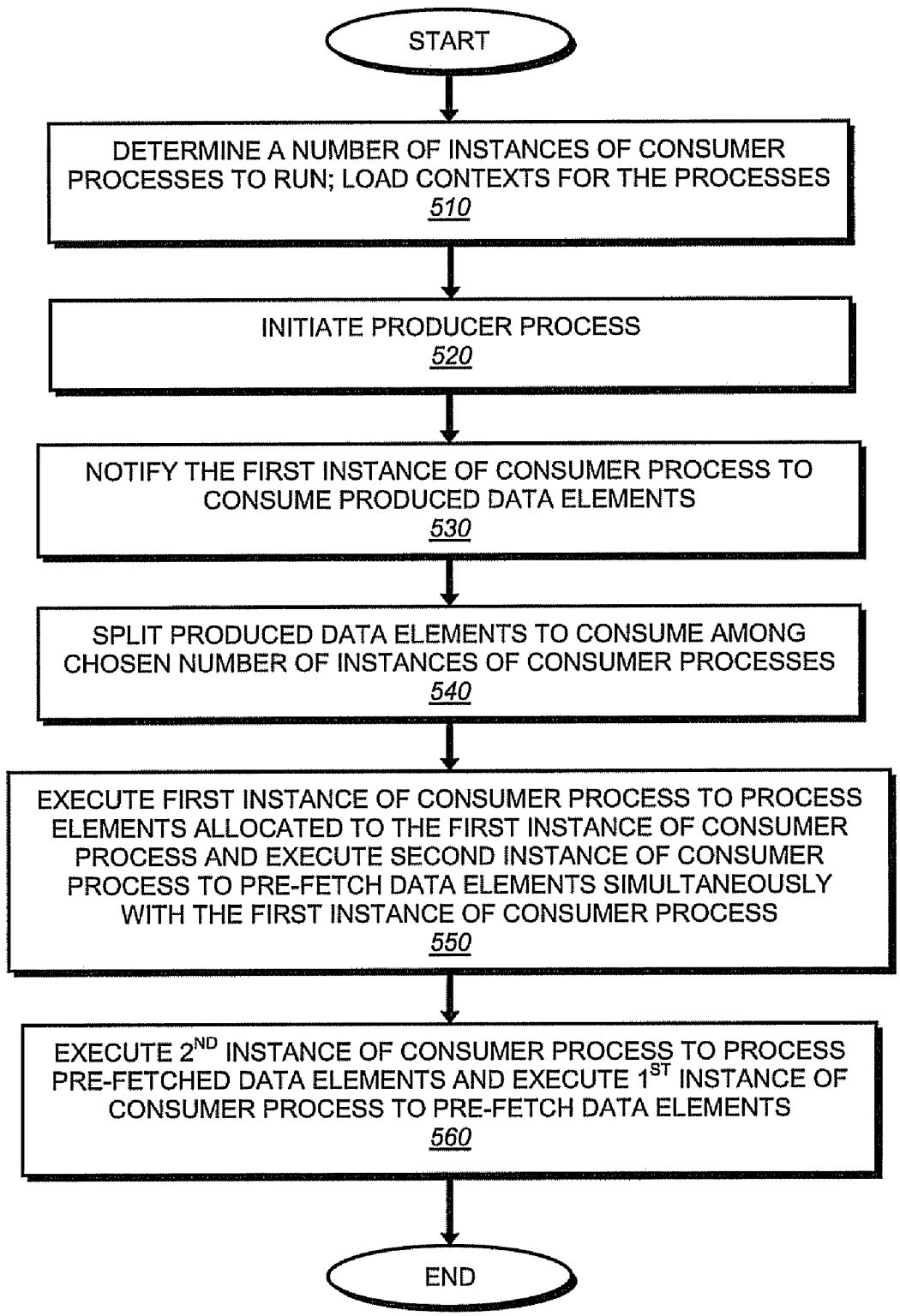
FIG. 5 is a flow diagram of a novel method to improve efficiencies in consumer-producer communications in a multi-core system.

Referring now to FIG. 5, it illustrates a flow diagram of a method for improving throughput of a multi-core system according to embodiments of the present invention. Initially, a determination is made as to a number of instances of consumer processes to run in a multi-core system (such as system 200 shown in FIG. 1B). This decision can be made by a scheduler module on the CPU core where the producer process is executed. In other implementations, such a decision can be made by the producer process, or by any other process. As previously described, a process is an instance of a computer program that is being executed. Each execution of the same set of instructions of a computer program is known as an instance. Once the process has been scheduled to a CPU core by a scheduler module, a context switch is performed (e.g., populating CPU core with the context information of a process). Execution context information for each process may include data loaded into the registers, memory mapping information associated with the process (such as memory page tables), and/or other information related to a process.

Then a producer process begins execution on a CPU core. As described herein, execution of the producer process involves collecting multiple data packets, processing those data packets (in the example of the producer thread executing the TCP/IP functionality, the producer thread performs TCP/IP processing of the data packet and stores data packets in memory). The producer process also provides pointers (data elements) indicating where data packets are stored in the main memory. The producer thread then signals the first consumer process for execution (using various signaling mechanisms described above) (step 530). Producer process provides data elements. The consumer process uses the data elements provided by the producer process to access data packets in memory and to process them.

The producer process decides to split processing of the produced data elements among the chosen number of consumer instances (step 540). As described herein, in one implementation, producer process may signal a first instance of a consumer process to execute by providing a number of data elements to process. In another embodiment, the first instance of the consumer process is signaled to be executed after a predetermined period of time specified by the producer process. Those skilled in the art would understand that various mechanisms can be chosen to signal the first instance of the consumer process to execute.

While the first instance of the consumer process executes data elements stored in the shared data structure (e.g., data structure 212), the producer process signals execution of the second instance of the consumer process executed on another CPU core. The producer process may indicate a number of data elements to be pre-fetched by the second instance of the consumer process while the first instance of the consumer process performs processing of the assigned data elements (step 550). When the first instance of the consumer process notifies the producer process that it has completed processing of the data elements, the producer process signals the second instance of the consumer process to start processing pre-fetched data elements. The producer process also signals the first instance of the consumer process to start pre-fetching other data elements (step 560).

Thus, a novel mechanism described herein significantly improves throughput of the multi-core system running multiple producer-consumer processes by executing more than one instance of consumer process simultaneously but with different functionalities (namely, "consuming" and "pre-fetching" phases) so that while one consumer process processes a first subset of data elements, another instance of the consumer process pre-fetches a second subset of data elements assigned to it into its local cache memory. When execution of the consumer scheduled on the first core has exhausted the data elements, the consumer execution moves to another core that has the pre-fetched data items in the appropriate caches. As a result, no additional time is spent on pre-fetching data elements by the second instance of the consumer process.

Figure 6:
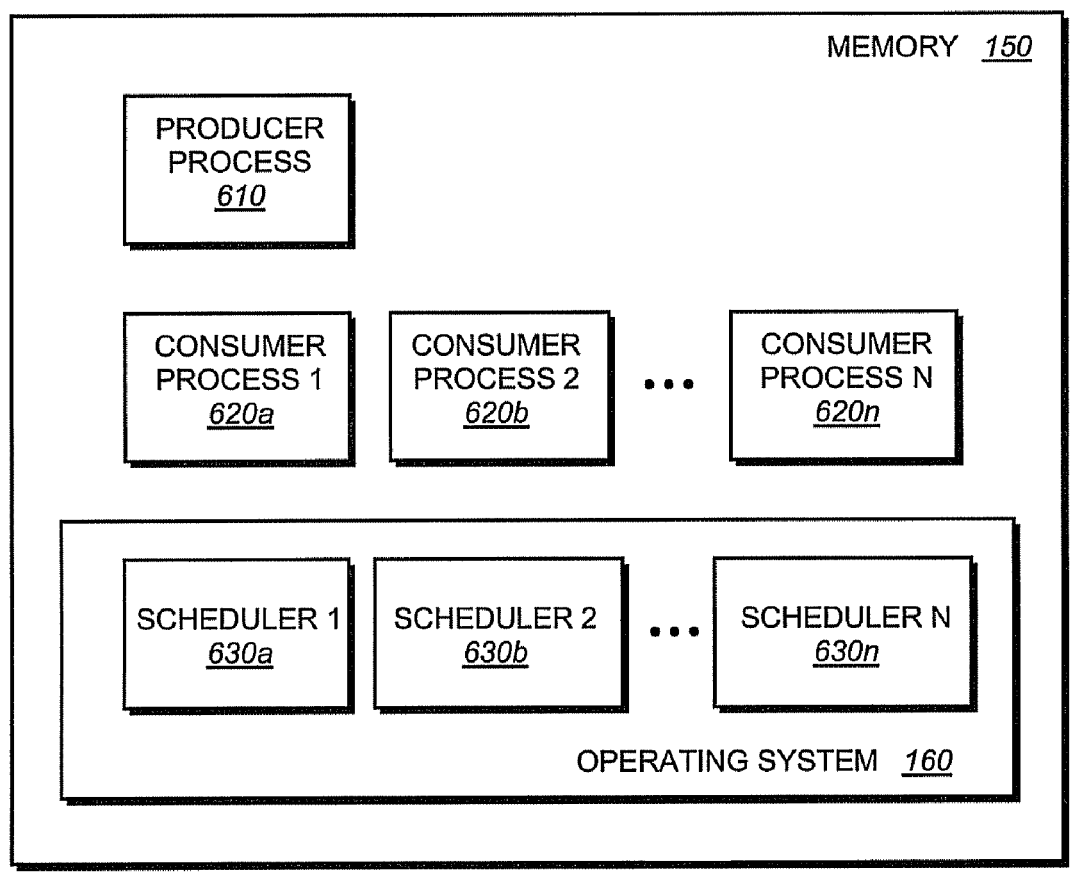
FIG. 6 is a diagram showing various components stored in main memory shown in FIG. 1B.

Referring now to FIG. 6, it illustrates various processes (described above) stored in main memory 150 shown in FIG. 1B. Typically, processes go through various process states, which determine how the process is handled by the operating system. When a process is created, its executable is loaded into main memory (e.g., memory 150). Once the process has been scheduled to a CPU (such as CPU 110, 120, or 130 shown in FIG. 1B) by the operating system scheduler, a context switch is performed (e.g., populating the processor core registers with process information). Then, the CPU core actually starts executing the process' instructions. As shown in FIG. 6, memory 150 stores various processes (such as a producer process 610 and one or more consumer instances of consumer process (620a through 620n)). Memory 150 also stores operating system 160, which in turn includes a scheduler module, different instances of which runs on different cores. A scheduler instance chooses processes for execution on its CPU core.

Although the present invention has been described in the context of improving throughput of communication between two isolated entities, such as processes in a multi-core system, novel techniques described herein are also applicable to a virtual machine environment as described below. A virtual machine environment includes a computer, such as a storage system (e.g., storage system 100), executing a virtual machine operating system (e.g., hypervisor). Hypervisor (a virtual machine monitor (VMM)) is a virtualization platform that allows multiple operating systems to run on a single computer at the same time. The hypervisor along with one or more "guest" operating systems essentially implement virtual machines. Each guest operating system may comprise a conventional general purpose operating system, such as Microsoft® or Linux®, etc. or may comprise a specialized operating system, such as a storage operating system. Furthermore, it may be desirable to execute a plurality of guest operating systems (or a plurality of instantiations of a guest operating system) within a virtual machine environment configured in a clustered arrangement. Thus, a cluster may comprise of identical guest operating systems or may comprise of a heterogeneous pairing of guest operating systems.

Figure 7:
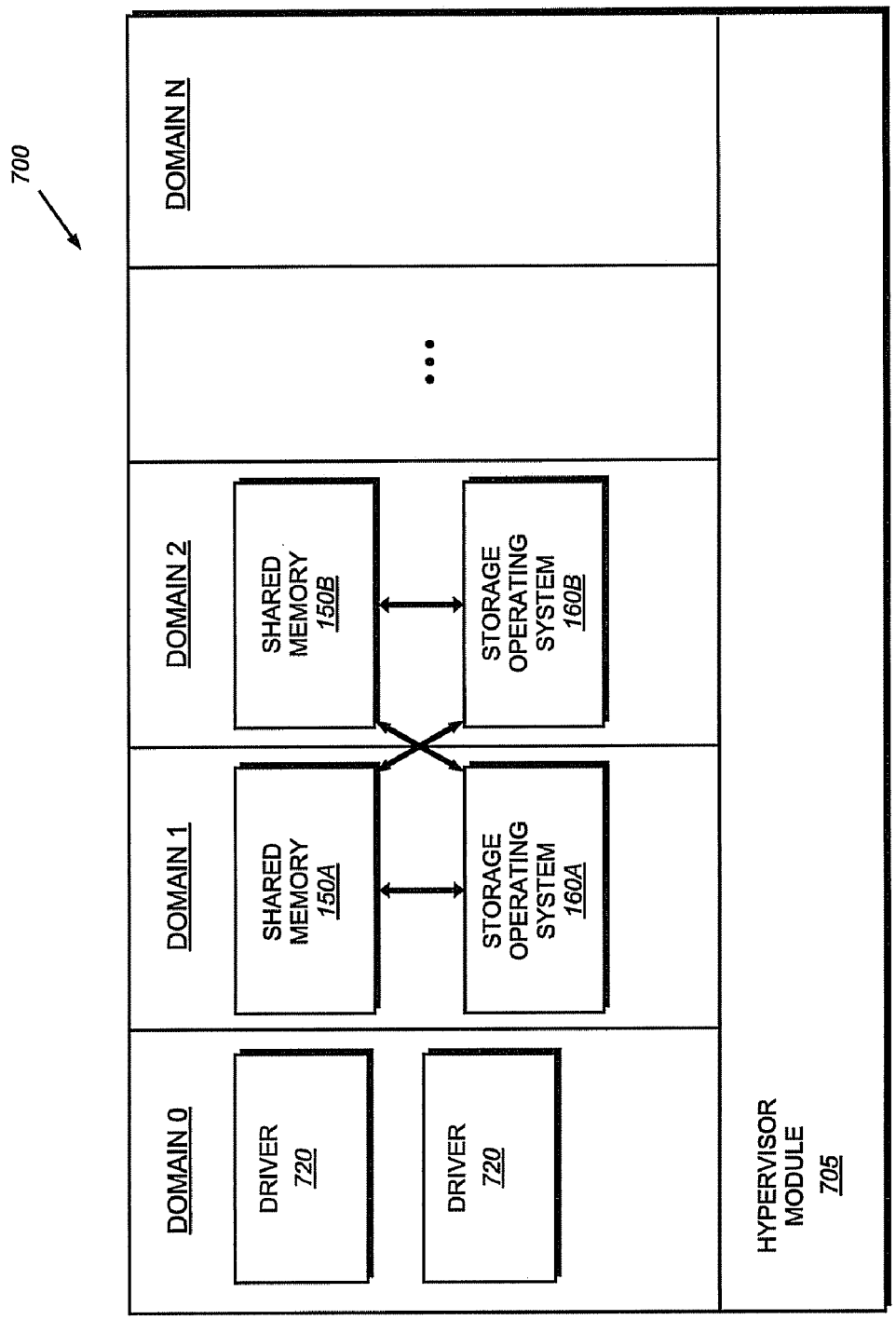
FIG. 7 is a virtual machine environment within which the present invention can be implemented.

FIG. 7 is a schematic diagram of an exemplary virtual machine operating system 700 in accordance with an illustrative embodiment of the present invention. Illustratively, the virtual machine operating system 700 comprises a hypervisor module 705 that masks low-level hardware operations from the guest operating systems executing within various domains of the virtual machine operating system 700.

Illustratively disposed over the hypervisor module 705 is a plurality of domains, for example, Domain 0, 1, 2, etc. As used herein, a hypervisor is a virtualization platform that permits a plurality of guest operating systems to execute on a computer at the same time. Each domain is representative of a virtual machine within which a guest operating system executes. In the illustrative embodiment of the Xen™ operating system provided, Domain 0 provides administrator functionality. Domain 0 illustratively executes a Linux based kernel along with one or more administrative modules, such as a heartbeat monitor 710. Domain 0 may also include, for example, a plurality of software drivers 720 adapted to interface with various hardware components including, for example, the network drivers 162 (shown in FIG. 1A), storage drivers 176 (also shown in FIG. 1A). The drivers 720 illustratively provide an interface for I/O operations issued by the guest operating systems.

In the example shown in FIG. 7, Domain 1 and Domain 2 each execute a storage operating system 160 arranged in a cluster configuration. In accordance with the principles of the present invention, Domain 1 includes a shared memory region 160A, while Domain 2 includes a shared memory region 150B. Since the memory regions are shared, storage operating system 160A has access to shared memory region 150B, while storage operating system 160B has access to shared memory region 150A. In this embodiment, the producer functionality would be running inside the kernel of one domain (e.g., Domain 1), while the consumer functionality would be running inside the kernel of the second domain (e.g., Domain 2 and Domain 3). A producer process running inside the kernel of Domain 1 may produce one or more data elements (address locations that point to processed data items in memory) and two or more instances of a consumer process can be executed in different domains (Domain 2 and Domain 3) so that while the first instance of a consumer process is executed in a "consuming" mode (i.e., processing a first subset of data elements produced by the producer process), the second instance of the consumer process pre-fetches, to its local cache memory (not shown), a second subset of data elements produced by the producer process. Thus, advantageously, the second subset of data elements that need to be processed by the second instance of the consumer process is already cached at the domain where the second instance is running even before the second instance of the consumer process starts processing the second subset of data items. When execution of the consumer functionality in the first domain has exhausted the first subset of the data items, the consumer execution moves to another domain that has pre-fetched data elements so that no additional time is spent to perform lengthy address translations, which typically require multiple memory accesses. Importantly, the pre-fetch for the data elements has happened in overlapping manner with the consumption of the previous set of data elements. Since no additional time is spent on pre-fetching data elements, the number of data elements consumed by the system over a time interval (i.e., throughput) increases. Furthermore, since the cache memory is already populated with the second subset of data elements, the cache misses, which would have otherwise been incurred by the second instance of the consumer process, can be avoided.

Although the present invention, for the purpose of explanation, has been described with reference to specific exemplary embodiments, it will be understood that the invention is not limited to the embodiments described. A person of ordinary skill in the art would understand that the present invention can be practiced with modifications and alternations to those embodiments or can be practiced in other embodiments within the spirit and scope of the appended claims.

Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or system.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems registers and memories into other data similarly represented as physical quantities within the computer system.

The present invention can be implemented by apparatuses for performing the operations herein. These apparatuses may be specially constructed for the required purposes or they may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A method for optimizing data processing in a producer-consumer environment on a multi-core system having two or more processing cores, the method comprising:

executing a producer process on a processing core in the multi-core system, the producer process performs processing of data items and producing data elements representing an address of data items stored in shared memory so that a consumer process can access the data items and process the data items according to the producer-consumer relationship;

pre-loading execution contexts of two or more instances of a consumer process, each instance is executed on a separate processing core in the multi-core system;

executing a first instance of a consumer process on a processing core to consume a first subset of data elements produced by the producer process;

while executing the first instance of the consumer process on a processing core, simultaneously executing a second instance of the consumer process to pre-fetch, to an associated cache memory, a second subset of data elements produced by the second instance of the consumer process; and upon completion of consumption of the first subset of data elements by the first instance of the consumer process, executing the second instance of the consumer process on the second core to process the pre-fetched second subset of data elements, without performing additional memory accesses to pre-fetch from the main memory data items pointed to by the second subset of data elements;

wherein the optimization of data processing occurs in a virtual machine environment executing a virtual machine operating system and two or more guest operating systems.

2. The method of claim 1, wherein executing a second instance of the consumer process is performed in overlapping manner with execution of the first instance of the consumer process.

3. The method of claim 1, further comprising:
while processing pre-fetched elements by the second instance of the consumer process, executing the first instance of the consumer process on the first core to pre-fetch a third subset of data elements.

4. The method of claim 1, further comprising a step of determining how the produced data elements will be assigned to two or more instances of consumer processes for processing.

5. The method of claim 1, wherein the data elements are stored in a data structure maintained in a memory region shared by the producer process and the consumer process.

6. The method of claim 1, wherein producing data elements further comprises:
receiving a data item;
processing the data item;
storing the data item in a memory shared among the producer process and one or more instances of the consumer processes; and storing, in a memory region shared among the producer process and one or more instances of the consumer process, a data element representing a relative address of a memory region shared between a consumer process and a producer process.

7. The method of claim 1, wherein consuming data elements further comprises:
using a data element produced by the producer process and representing a relative address of a memory region shared between a consumer process and a producer process, to access a scatter gather array which stores relative addresses of data items stored in memory;
using the relative addresses of the data items, translate the addresses to virtual addresses of the data items;
performing translation of the virtual addresses of the data items to physical addresses of the data items;
accessing the data items in the memory using the physical addresses to store the data items in a cache memory associated with the processor core on which a consumer process is running; and
processing the accessed data items according to consumer functionality.

8. The method of claim 1, wherein pre-loading a context for execution of two or more instances of a consumer process further comprises storing context information in a processing core on which an instance of a consumer process is executed.

9. The method of claim 1, wherein pre-fetching of the second subset of data elements by the second instance of the consumer process further comprises:
using a data element representing a relative address of a memory region shared between a second instance of a consumer process and a producer process, to access a scatter gather array which stores relative addresses of data items stored in memory;
translating the relative address to a virtual address of the scatter gather array;
translating the virtual address of the scatter gather array to a physical address;
using the physical address of the scatter gather array to access entries in the array pointing to relative addresses of the data items stored in the memory;
translating the relative addresses of the data items to virtual addresses of the data items;
translating the virtual addresses of the data items to physical addresses; and
using the physical address, storing the data item in the cache memory associated with the processor core executing the second instance of the consumer process.

10. The method of claim 1, further comprising:
sending a first notification, by the producer process, to the first instance of the consumer process to initiate consumption of the first subset of data elements;
sending a second notification, by the producer process, to the second instance of the consumer process, to initiate pre-fetching of the second subset of data elements; and
upon receiving confirmation from the first instance of the consumer process that consumption of the first subset of the data elements is completed, sending a third notification, to the second instance of the consumer process, to initiate consumption of the second subset of data elements pre-fetched by the second instance of the consumer process.

11. The method of claim 1, wherein pre-loading execution context further comprises loading memory mapping information associated with a process.

12. A multi-core system for optimizing data processing in producer-consumer environments, comprising:
a processor;
a first processing core of the processor for executing a producer process, the producer process produces one or more data elements representative of an address of data items stored in a memory;
a second processing core for executing a first instance of a consumer process configured to consume a first subset of data elements produced by the producer process by accessing the data items stored in the memory using the first subset of data elements and to process the data items according to consumer functionality;
a third processing core for executing a second instance of the consumer process to pre-fetch, to an associated cache memory, a second subset of data elements produced by the second instance of the consumer process;
wherein the first instance of the consumer process is executed simultaneously with the second instance of the consumer process and wherein upon completing consumption of the first subset of data elements by the first instance of the consumer process, the third processing core executes the second instance of the consumer process to process the pre-fetched second subset of data elements, without performing memory accesses for data items pointed to by the second subset of data elements;
wherein the optimization of data processing occurs in a virtual machine environment executing a virtual machine operating system and two or more guest operating systems.

13. The system of claim 12, wherein the first instance of the consumer process is executed in overlapping manner with the second instance of the consumer process.

14. The system of claim 12, wherein optimizing of data processing occurs in a virtual machine environment, comprising:
a first domain for executing a producer process, the producer process produces one or more data elements representative of an address of data items stored in a memory;
a second domain for executing a first instance of a consumer process configured to consume a first subset of data elements produced by the producer process by accessing the data items stored in the memory using the first subset of data elements and to process the data items according to consumer functionality; and
a third domain for executing a second instance of the consumer process to pre-fetch, to an associated cache memory, a second subset of data elements produced by the second instance of the consumer process.

15. The system of claim 12, further comprising:
- a first scheduler module executed on the first processing core and configured to schedule execution of the producer process;
- a second scheduler module executed on the second processing core and configured to schedule execution of the first instance of the consumer process upon receiving a notification from the producer process; and
- a third scheduler module executed on the third processing core and configured to schedule execution of the second instance of the consumer process upon receiving a notification from the producer process.

16. The system of claim 12, wherein the first processing core comprises:
- a first level of cache memory; and
- a second level of cache memory, wherein the second level of cache memory is larger than the first level of cache memory and the first level of cache memory has a faster access time than the second level of cache memory.

17. The system of claim 16, wherein two or more processing cores share a third level of cache memory.

18. The system of claim 12, further comprising a memory having a region shared by the producer process and the consumer process, wherein the shared memory region further comprises:
- a data structure comprising a plurality of entries, each entry storing a relative address of a scatter gather array in the shared memory region;
- one or more scatter gather arrays having a plurality of entries, each scatter gather array corresponds to a data packet processed by the producer process, each entry in the array stores a relative address of a data item in the memory.

19. A virtual machine environment executing a virtual machine operating system and two or more guest operating systems, the environment configured to optimize data processing in a producer-consumer relationship, comprising:
- a processor;
- a first domain for executing on the processor a producer process, the producer process produces one or more data elements representative of an address of data items stored in a memory;
- a second domain for executing a first instance of a consumer process configured to consume a first subset of data elements produced by the producer process by accessing the data items stored in the memory using the first subset of data elements and to process the data items according to consumer functionality; a third domain for executing a second instance of the consumer process to pre-fetch, to an associated cache memory, a second subset of data elements produced by the second instance of the consumer process; wherein the first instance of the consumer process is executed simultaneously with the second instance of the consumer process and wherein upon completing consumption of the first subset of data elements by the first instance of the consumer process, the third domain executes the second instance of the consumer process to process the pre-fetched second subset of data elements, without performing memory accesses for data items pointed to by the second subset of data elements;
- wherein the optimization of data processing occurs in a virtual machine environment executing a virtual machine operating system and two or more guest operating systems.

* * * * *